Patented July 8, 1941

2,248,408

UNITED STATES PATENT OFFICE 2,248,408

METHOD OF MAKING CADMIUM RED PIGMENTS

Gordon M. Juredine, Chicago, Ill., assignor to The Glidden Company, Cleveland, Ohio, a corporation of Ohio No Drawing. Application April 19, 1939, Serial No. 268,701

16 Claims. (Cl. 106—301)

This invention relates to the production of cadmium red pigments of the cadmium sulfoselenide type and has particular reference to the production of these pigments by a new method, characterized by the use of basically different chemical reactions than those heretofore employed, which produces pigments of more brilliant color than those heretofore produced, combined with greater economy of operation, and likewise makes possible the production of new shades of this type of color, heretofore not available. The invention is applicable to pure cadmium sulfoselenide pigments, to co-precipitated cadmium lithopone type reds, and to mechanical mixtures of the pure reds with extenders.

The methods in use heretofore, while of two distinct types, employ the same chemical reactions. In the one method, metallic selenium is dissolved in a sulfide liquid, generally sodium sulfide solution where a pure red is desired, or barium sulfide solution where a lithopone type red is desired. A cadmium salt solution, generally cadmium sulfate, is then struck with the sulfide liquor containing selenium; a brown precipitate is obtained consisting essentially of cadmium sulfide, containing small amounts of sulfo-selenide and substantial quantities of free selenium.

In the second method, a separate strike is made to obtain a cadmium sulfide precipitate; this precipitate is then wet milled with selenium, preferably in a pebble mill, to obtain an intimate mixture, and the slurry is thereafter pressed and dried to obtain a similar product to that of the first method, except that the selenium is probably all free, and the admixture is probably not as good. The products of either method may be mixed, mechanically or by co-precipitation, with barium sulfate or the like inert materials, which do not affect the reaction.

The precipitates are then calcined, in order to cause the selenium to react with the cadmium sulfide and replace part of the sulfur therein. The result is the development of a red pigment containing cadmium sulfide, cadmium selenide and cadmium sulfo-selenide in varying proportions, the color being dependent to a large extent on the amount of selenium combined with the cadmium.

The replacement of sulfur by the less reactive selenium is essentially a forced reaction, in the sense that the reaction must be carried out at temperatures where the vapor pressure of selenium is high. The necessity for using these high temperatures, to cause the reaction to take place, results in volatilization of a considerable portion of selenium. As may be expected from the law of mass action, the worst losses occur where it is desired to incorporate the largest percentages of selenium, in the deep red shades; in such cases, fully one-half of the selenium introduced into the reaction is volatilized. The method thus is wasteful of the most expensive ingredient of the finished product; while the bulk of the volatilized selenium can be recovered by condensing and treating the condensate, there is a considerable loss in the recovery systems.

A second important objection to the method results from the necessity for adding excess quantities of selenium to insure the desired shades. As the temperature of calcination ordinarily is below the boiling point of selenium, some unreacted selenium remains behind in the finished pigment, as black specks of vitreous elemental selenium. These specks are of course highly objectionable in a clean red pigment.

Still a third important point which must be considered in relation to the above process is the fact that the calcination must take place at temperatures where optimum reaction occurs, to develop the best color with the minimum loss of selenium. I have found, on investigation, that the optimum temperature for color development does not coincide with the optimum calcination temperature for pigment tinting strength. It is necessary, on the contrary, to balance the temperature so as to obtain a mean between the two desirable properties.

While saleable pigment has been produced by this method, there has always been a balancing between color and tinting strength, and a very high cost, due to loss of selenium. As a result of these difficulties, the cadmium reds have been used to replace organic toners only where their superior properties have outweighed their shortcomings in color, tinting strength and price. Furthermore, it has been impossible to make extremely bluish reds by the conventional reaction, the limit being where the molecular ratio of selenium to sulfur is almost 3 to 2.

I have discovered a new and improved method of producing cadmium reds, of the pure or inert-diluted type, which overcomes all three of the outstanding objections to the prior-art method, and by means of which all of the shades of the prior art can be reproduced at less cost, together with cleaner, richer, deeper shades not heretofore possible, containing higher ratio of combined selenium.

My invention comprises calcining cadmium sulfide containing active cadmium oxide with sulfur and selenium in a non-oxidizing atmosphere, thereby causing the sulfur to react with the oxygen of the active cadmium oxide to form sulfur oxides, and replacing the oxygen with selenium. To obtain the full benefit of my invention, there should be present sufficient free sulfur to react with all the oxygen of the cadmium oxide, and sufficient free selenium to replace the oxygen. However, sulfur may be used to replace oxygen instead of selenium, where less depth of shade is desired. The free sulfur and selenium for the calcination may be provided either in the form of sensible sulfur and selenium or in the form of a poly-sulfo-selenide combination in which form it is readily liberated, it being well known that these poly sulfide and poly-sulfo-selenide linkages are unstable compared to true chemical combinations.

Where more selenium is used than is necessary to replace the oxygen, the excess reacts with the pigment as in the prior art method. Where insufficient sulfur is present to form sulfur oxides with the oxygen, and an excess of selenium is present, the excess of selenium reacts to form selenium dioxide, and is volatilized. Where insufficient selenium plus sulfur is present, to both remove and replace all the oxygen, a residue of unreacted cadmium oxide remains to contaminate the finished pigment and dirty the color. It is thus apparent that while exact proportions are not essential to the practice of my invention, they are highly desirable if best color and least expense are to be attained.

In the preferred form of the invention a basic cadmium sulfide is calcined with free sulfur and selenium.

Preferably, I prepare my basic cadmium sulfide by precipitating cadmium hydroxide from a cadmium salt solution. A solution of a soluble sulfide is then added to the struck pulp, in such quantity as to produce a basic sulfide by reaction with the precipitated hydroxide. In this sulfide solution is dissolved sufficient free sulfur to react with the oxygen remaining in the precipitate after it reacts with the soluble sulfide, plus sufficient additional free sulfur plus free selenium to replace the oxygen which is removed by the original sulfur addition, the ratio of selenium to sulfur depending on the shade desired. The striking of the cadmium hydroxide solution with the soluble sulfide solution containing the dissolved selenium and sulfur apparently results in the precipitation of a cadmium poly-sulfo-selenide containing the cadmium hydroxide. The poly-sulfo-selenide then undergoes rearrangement during the calcination, making the sulfur and selenium available for reaction with the active cadmium oxide also formed during the heating. It thus appears that the cadmium sulfide acts as a base for the dispersion of the sulfur and selenium.

Cadmium hydroxide, prepared either with the object of making pure reds as for example, by precipitation, from a 36° Baumé chloride solution with 26° Baumé caustic soda solution until a test shows no cadmium remaining in dissolved form, or with the object of making lithopone reds, as, for example, by precipitation of a 36° Baumé sulfate solution with a solution of about equal volume containing a mixture of caustic soda and barium hydrate (say 30 pounds of caustic soda and 87 pounds of barium hydrate to every 170 pounds of cadmium sulfate), in all cases results in a slurry that contains cadmium hydroxide in two forms— one easily reactable with a soluble sulfide to form cadmium sulfide, and one rather difficultly reactable. In the examples cited below, the ratio of readily reactable cadmium hydroxide to difficultly replaceable hydroxide is 2 to 3. The slurry, when reacted with a soluble sulfide, will have 40% of its hydroxide replaced by sulfur at ordinary temperatures; the residual 60% will not react except at a boil, and prolonged treatment is required. This ratio may be varied almost at will by varying precipitating conditions and precipitants, but I find it very suitable for the manufacture of cadmium reds. The formula for such a cadmium hydroxide would be written as follows:

$$2Cd(OH)_2 \cdot 3(Cd(OH)_2)$$

the parentheses representing the difficult replaceability of the enclosed groups.

On treatment with a sulfide liquor, the reaction would normally proceed to $$2CdS \cdot 3Cd(OH)_2$$

although some of the hydroxyl in the parentheses could be replaced by continued action at the boiling point.

The hydroxide basic sulfide may be heated to 400° F. without loss of water, but on calcination to the temperatures preferably employed, water is lost to produce a compound which may be represented by the formula $$2CdS \cdot 3CdO$$

which is a typical oxide basic sulfide such as may be calcined with sulfur and selenium in a non-oxidizing atmosphere to produce my improved red pigment. It is pointed out that the release of $H_2O$ from the normally stable hydroxide basic sulfide is in the nature of a breaking up of the molecular complex, rather than in the nature of a simple dehydration and leaves the cadmium oxide in a relatively high state of activation. The cadmium oxide after the loss of $H_2O$ is in a sufficiently active condition to give rise to a reaction between available sulfur and the oxygen during the calcination.

As outlined above, I react this product by heating in a non-oxidizing atmosphere with sulfur and selenium, the sulfur being present in sufficient quantity to react with the oxygen to form $SO_2$, and the selenium plus the excess sulfur being sufficient to replace the oxygen formerly attached to the cadmium. The reaction may be written as follows:

$$2-2CdS \cdot 3CdO + 3S + 2(XSe + (3-X)S) = 2CdS \cdot XCdSe \cdot (3-X)CdS + 3SO_2$$

where X may be any number or fraction up to 3.0, the limit fixed by the number of cadmium oxide groupings.

The ratio of CdO to CdS in the basic sulfide can be varied at will, by reacting more or less of the hydroxide with sulfide. If pure CdO or the hydroxide alone is used in the absence of cadmium sulfide I find that a true red pigment is not formed, but a dirty brown product, so that it appears to be essential that a cadmium sulfide base be present for the dispersion of the selenium and sulfur. Reduction of the CdO ratio to CdS reduces the amount of oxygen available for replacement, and when the CdO is eliminated, the prior art method results. For these reasons, I prefer to work with intermediate basic sulfides, rather than approach either a pure sulfide or a pure oxide.

As indicated above, the sulfur and selenium are preferably blended with the basic sulfide by dissolving them in the sulfide liquor used to react with the hydroxide slurry, as most intimate mixture is obtained in this manner. They may, however, be added to the struck pulp by pebble milling, or by any other method which would insure thorough mechanical admixture.

*Example 1*

As a typical example of my invention, I dissolved 170 pounds of cadmium sulfate in sufficient water to produce a 25° Baumé solution at 25° C. A solution of equal volume, containing 30 pounds of caustic soda and 87 pounds of barium hydroxide (to increase the barium sulfate content of the final product to the regular lithopone content) were then added, and a precipitate of cadmium hydroxide plus barium sulfate was formed, containing 91.6 pounds of cadium. The cadmium was to be precipitated to form the compounds $2CdS \cdot 3Cd(OH)_2$, and a shade of red was desired which would require 30 pounds of selenium. The free sulfur content was estimated as follows:

| | |
|---|---|
| Total needed to combine with cadmium_____pounds__ | 26 |
| Total needed to combine with oxygen to form $SO_2$_____pounds__ | 7.84 |
| | —— 33.84 |
| Sulfur supplied by BaS solution (app. 40% of 26 pounds)_____pounds__ | 10.3 |
| Sulfur equivalent supplied by 30 pounds selenium_____pounds__ | 12.1 |
| | —— 22.40 |
| Free sulfur needed_____pounds__ | 11.44 |

I therefore dissolved 11.44 pounds of sulfur and 30 pounds of selenium in a 17° Baumé barium sulfide solution containing a total of 54.5 pounds barium sulfide (just sufficient theoretically to produce the compound $2CdS \cdot 3Cd(OH)_2$ and added the barium sulfide solution containing the free sulfur and selenium to the cadmium hydroxide slurry, making the strike in hot solution almost at the boiling point. The precipitate was washed in the tank by decantation until the wash waters were but very slightly alkaline, pressed and dried. The dried raw pigment was then calcined in an inert atmosphere at 1100° F. for one-half hour. The resultant pigment was a lithopone type cadmium red of a medium red color.

Attempts to reproduce this color by the prior art method, dissolving the selenium in barium sulfide liquor, were not wholly successful. A pigment was produced with the same barium sulfate content, and the same depth of shade. On comparing the two pigments, it was noted that the old method required about 47 pounds of selenium—a saving of 35%; the new method color was cleaner and brighter, with a more bluish and less brown undertone and tint; and the new method color was about 10% stronger in tinting strength.

*Example 2*

As another example of my invention, I took 60 gallons of a 36° Baumé cadmium sulfate solution containing 170 pounds of cadmium sulfate, at 70° F. and aded to it a solution of 87 pounds $Ba(OH)_2$ and 30 pounds NaOH in 800 pounds of water (the alkaline solution having been heated to 150° F. and the carbonates allowed to settle out) until no more Cd ions were in solution (about 2% excess alkali over theoretical). The white slurry was heated rapidly to 140° F. and 480 pounds of 16° Baumé barium sulfide liquor was added at 140° F., containing 39 pounds of dissolved selenium and 8 pounds of dissolved sulfur. The brown slurry was raised slowly to 180° F. and the end point adjusted as closely as possible to just show no excess sulfide ions in solution. The precipitate was then settled, washed to neutrality with brom-thymol-blue, filter pressed, dried and calcined as above in a non-oxidizing atmosphere. A yield of about 360 pounds of finished pigment was obtained, thus requiring 222 pounds of selenium per ton of pigment, as against 350 pounds required by the prior art method. The product is furthermore characterized by a much cleaner color than the same shade made by the old process.

*Example 3*

A third, extra-light red lithopone was made by following the procedure of Example 2, but using 18 pounds of selenium and 16.5 pounds of sulfur. While the savings in selenium were less noticeable, both the saving, and increased cleanliness of color were noted, although to a lesser degree than with the pigments requiring more selenium.

*Example 4*

A pure cadminum red, without diluting pigment, was made in a medium shade by dissolving 210 grams $CdCl_2$ to obtain 500 c. c. of a 36° Baumé solution at 100° F. This was precipitated with a 26° Baumé solution of NaOH at 120° F. until no Cd ions remained in solution (about 2% excess over theoretical required). This gave a cadmium hydroxide with about 40% easily replaceable hydroxyls. The strike was washed with water, and heated; 750 c. c. 18° Baumé BaS liquor containing 30 grams of selenium and 8 grams of sulfur were added near the boiling point, and the end point was where the excess of sulfide just disappeared on 30 minutes boiling. The precipitate was washed by decantation to a pH of 6.8 in the wash water, pressed, dried and calcined out of contact with air at 1075° F. for one-half hour to obtain a pure cadmium red of medium shade.

Inasmuch as the color is developed by the reaction in the calciner, it is obvious that this phase of the process is of extreme importance. Exclusion of air is the prime requirement of the calcination, since the process depends on the elimination of the oxygen in the precipitate. The use of a closed container is permissible; but best results are obtained with inert or reducing atmospheres containing no free oxygen.

Temperature of calcination is likewise important, but will depend on the type of equipment. The important point is for the precipitate to absorb sufficient heat for the reaction to take place; and it is desirable to do this as rapidly as possible. However, as the temperature of exposure is increased, the pigment loses tinting strength somewhat. Since the pigment develops its color by the reaction, the optimum conditions are to develop the color quickly, and quench immediately to prevent loss of strength by overheating. I prefer to calcine at about 1100° F. and find about one-half hour to be satisfactory; but both the time and temperature may vary considerably, depending on the method of heating, etc. I have calcined at as high as 1325° F. reducing the time to 5 minutes; but in such a case, tinting strength is off somewhat. My preferred temperature range is from about 1050 to 1150° F.

As an even application of heat is highly desirable, I prefer to calcine in a rotary calciner which moves the pigment about, to insure more uniform heat application.

While I have shown but a few examples of my invention, various modifications may be resorted to. Thus, the basic sulfide may be prepared by other means than that described; and the free sulfur and selenium may be mixed with the basic sulfide by peddle-milling, or in any other convenient manner. The essence of my invention comprises the reaction of cadmium basic sulfide with sulfur and selenium in the absence of any considerable quantity of air, to produce a pigment superior in color while a minimum of selenium is used.

A further result of my invention resides in the ability to produce red pigments of deeper shades than those heretofore available. The deepest red heretofore available is that corresponding to the color of Example 2, in which the molecular ratio of combined selenium to combined sulfur is approximately 3 to 2. It is possible, by my method, to increase this ratio to obtain deeper shades, ranging up to a molecular ratio of 2 to 1 and higher. These new colors are characterized by being richer, more bluish red than the prior art pigments, as well as by their selenium sulfur ratio.

Furthermore, the pigments made by my process, even in the lower ratios, are considerably cleaner and brighter than the same products made by the other methods, and different somewhat in shade at the same selenium sulfur ratios.

"Active" cadmium oxide as used in the claims is cadmium oxide which is in sufficiently active condition to give rise to reaction between the available sulfur present and the oxygen of the cadmium oxide, a preferred example of such "active" cadmium oxide being the cadmium oxide resulting from a breaking up by heating of the molecular complex of the hydroxide basic sulfide of cadmium and the release of $H_2O$ therefrom.

This application is a continuation-in-part of application Serial No. 122,423, filed January 26, 1937.

I claim:

1. The method of making cadmium sulfoselenide pigment which comprises calcining basic cadmium sulfide with sulfur and selenium in a non-oxidizing atmosphere, whereby oxygen is eliminated from the basic sulfide and replaced at least in part by the selenium.

2. The method of making cadmium sulfoselenide pigment which comprises calcining basic cadmium sulfide with sulfur and selenium in a non-oxidizing atmosphere at a temperature of 1050–1150° F., whereby oxygen is eliminated from the basic sulfide and replaced at least in part by the selenium.

3. The method of making cadmium sulfoselenide pigment which comprises calcining in a non-oxidizing atmosphere, basic cadmium sulfide with sufficient sulfur to combine with the oxygen in the basic sulfide, and with sufficient material of the class consisting of selenium and a mixture of sulfur and selenium to replace the oxygen in the basic sulfide.

4. The method of making cadmium sulfoselenide pigment which comprises calcining basic cadmium sulfide with sulfur and selenium, under non-oxidizing conditions whereby the oxygen of the basic sulfide reacts with sulfur to form sulfur dioxide, and the selenium and residual sulfur replace the oxygen in the cadmium sulfide.

5. The method of making cadmium sulfoselenide pigment which comprises precipitating cadmium hydroxide from a cadmium salt solution, reacting the slurry with a water soluble sulfide solution to produce a basic cadmium sulfide, and calcining the dried basic sulfide under non-oxidizing conditions with sufficient sulfur to combine with the oxygen in the basic sulfide, and sufficient material of the class consisting of selenium and a mixture of sulfur and selenium to replace the oxygen in the basic sulfide.

6. The method of claim 5, in which the sulfur and selenium are mixed with the basic sulfide by dissolving them in the soluble sulfide solution.

7. The method of making a cadmium sulfoselenide pigment of the lithopone type which comprises precipitating cadmium hydroxide from a cadmium sulfate solution, reacting the slurry with barium sulfide solution to produce barium sulfate and basic cadmium sulfide, and calcining the dried basic sulfide under non-oxidizing conditions with sufficient sulfur to combine with the oxygen in the basic sulfide, and sufficient material of the class consisting of selenium and a mixture of sulfur and selenium to replace the oxygen in the basic sulfide.

8. The method of claim 7 in which the sulfur and selenium are mixed with the basic sulfide by dissolving them in the barium sulfide solution.

9. The method of making cadmium sulfoselenide pigment which comprises precipitating cadmium hydroxide from a cadmium salt solution, reacting the slurry with a water soluble sulfide solution to produce a basic cadmium sulfide, and calcining the basic sulfide with sufficient sulfur and selenium, under non-oxidizing conditions, and for such a time and temperature that the oxygen of the basic sulfide is eliminated substantially as oxide of sulfur, and replaced by selenium and any residual sulfur.

10. The method of claim 9, in which the sulfur and selenium are mixed with the basic sulfide by dissolving them in the soluble sulfide solution.

11. The method of making cadmium sulfoselenide pigment which comprises precipitating cadmium hydroxide from a cadmium salt solution, reacting the slurry with a water soluble sulfide solution to produce a basic cadmium sulfide, and calcining the basic sulfide with sufficient sulfur and selenium, under non-oxidizing conditions, at 1050 to 1150° F. for a period of an hour or less, whereby the oxygen of the basic sulfide is eliminated substantially as oxide of sulfur, and replaced by selenium and any residual sulfur.

12. The method of claim 11, in which the sulfur and selenium are mixed with the basic sulfide by dissolving them in the soluble sulfide solution.

13. The method of making cadmium sulfoselenide pigment which comprises calcining basic cadmium sulfide with sulfur and selenium in a non-oxidizing atmosphere, the amount of sulfur being sufficient to react with the oxygen of the basic sulfide to form sulfur dioxide and to replace the oxygen not replaced by the selenium.

14. The method of making cadmium sulfoselenide pigment which comprises reacting a basic cadmium sulfide with sulfur in amount sufficient to form sulfur dioxide with the oxygen of the basic sulfide, and replacing the oxygen so removed with a substance selected from the class consisting of selenium and a mixture of sulfur and selenium.

15. The method of making a red cadmium sulfo-selenide pigment which comprises calcining under non-oxidizing conditions an uncalcined cadmium sulfo-selenide precipitate containing active cadmium oxide, the time and temperature of the calcination, and the amount of sulfur and selenium available in the cadmium sulfo-selenide precipitate being such that the oxygen of the cadmium oxide is substantially eliminated as oxide of sulfur, and replaced by one of the substances selected from the class consisting of selenium, and selenium and sulfur.

16. The method of making a red cadmium sulfo-selenide pigment which comprises calcining under non-oxidizing conditions a mixture containing active cadmium oxide, sulfur, selenium, and a cadmium sulfide base for the dispersion of the sulfur and selenium, the amount of sulfur and selenium being such that the oxygen of the cadmium oxide is removed as oxide of sulfur and replaced by one of the substances selected from the class consisting of selenium, and selenium and sulfur.

GORDON M. JUREDINE.